Aug. 15, 1950   R. S. WEHNER   2,518,843
AIRCRAFT ANTENNA

Filed April 25, 1947   4 Sheets-Sheet 1

INVENTOR
ROBERT S. WEHNER
BY
ATTORNEY

Aug. 15, 1950     R. S. WEHNER     2,518,843
AIRCRAFT ANTENNA

Filed April 25, 1947                                         4 Sheets-Sheet 2

INVENTOR
ROBERT S. WEHNER
BY
ATTORNEY

Aug. 15, 1950     R. S. WEHNER     2,518,843
AIRCRAFT ANTENNA
Filed April 25, 1947     4 Sheets-Sheet 3
*Fig.9*     *Fig.10*     *Fig.12*
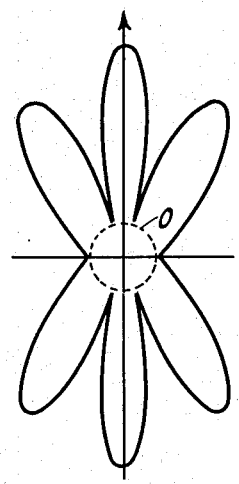
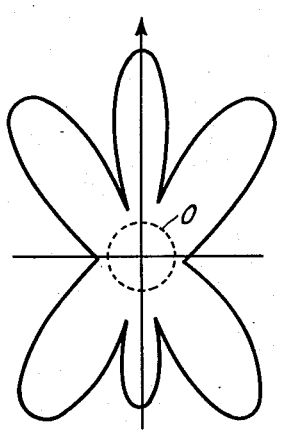
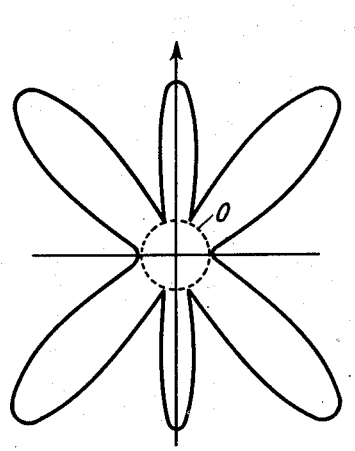
*Fig.11*
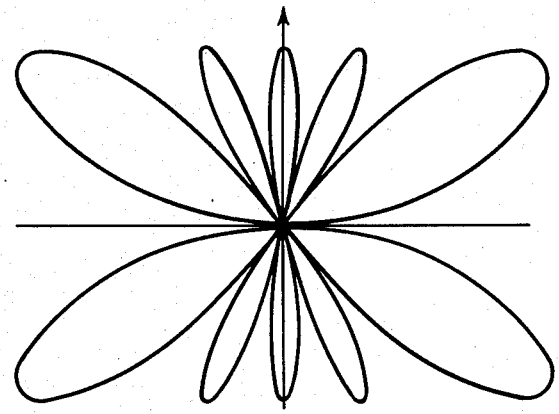
*Fig.13*
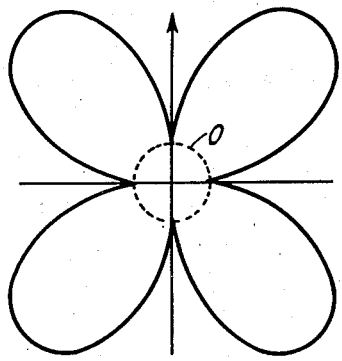
*Fig.14*
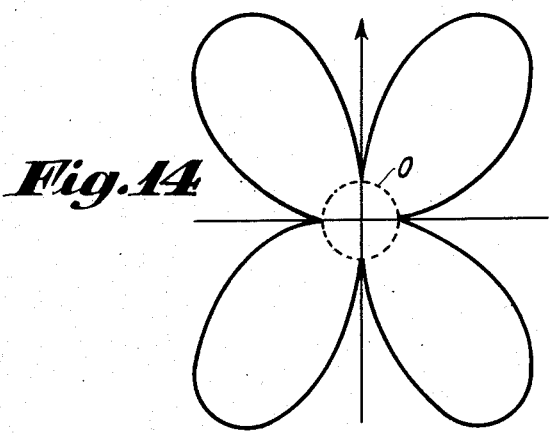
INVENTOR
ROBERT S. WEHNER
BY
ATTORNEY

INVENTOR
ROBERT S. WEHNER
BY
ATTORNEY

Patented Aug. 15, 1950

2,518,843

UNITED STATES PATENT OFFICE 2,518,843

AIRCRAFT ANTENNA

Robert S. Wehner, Port Jefferson, N. Y., assignor to Radio Corporation of America, a corporation of Delaware Application April 25, 1947, Serial No. 743,962

16 Claims. (Cl. 250—33)

The present invention relates to aircraft antennas and more particularly to aircraft antennas which are structurally a part of the aircraft itself.

An object of the present invention is to eliminate external antennas on airplanes.

Another object of the present invention is to provide an antenna for use on airplanes which is actually a part of the wing structure of the airplane.

Another object of the present invention is the provision of a radiating system for aircraft in which the presence of the fuselage, tail assembly, motor nacelles, etc., produces very little effect on the radiation pattern.

Another object of the present invention is the provision of an antenna system for aircraft which is relatively flat in response over a very wide range of frequencies.

Still a further object of the present invention is the provision of an aircraft antenna which may be matched by means of an automatic tuning device over a range of frequencies extending from a ratio of wingspread to wavelength of .20 to more than 2.00.

A further object of the present invention is to provide aircraft antenna which is broad band and capable of efficient operation when fed directly without a matching section.

The foregoing objects and others which may appear from the following detailed description are attained by cutting each wing of a metal sheathed aircraft at a short distance in from the tip, the outboard sections of the wing being fed directly through a transitional tapered section from the inner conductor of coaxial lines leading from the fuselage through the inboard section of the wing to the tip. The two coaxial lines within the fuselage may be coupled to a balanced output circuit of radio transmitters or a balanced input circuit of radio receiving equipment. The metal sheath or skin of the wings thus constitutes the conductive outer surface of a radiator having transverse dimensions which are large in terms of the operating wavelength.

The present invention will be more fully understood by reference to the following detailed description which is accompanied by a drawing in which:

Figure 1 illustrates generally in a plan view the application of the present invention to an airplane;

Figures 2 to 14 inclusive illustrate the radiation patterns of an antenna arrangement as shown in Figure 1 for different ratios of wingspread to wavelength, while Figure 15 illustrates the variation in input impedance and input resistance over a band of frequencies for two different feed points in the arrangement of Figure 1, and Figure 16 compares the input resistance and input reactance variations with a variation in frequency for a shunt-fed wing antenna and a directly-fed antenna.

Referring now to Figure 1, there is illustrated an airplane having wings 10 and 20. The wings have a conductive outer skin or shell. A short distance in from the tip of each wing, the wing is cut or made electrically discontinuous, thus forming electrically isolated outboard sections 11 and 21. The outboard sections are maintained in position by suitable insulating structural members 13 and 23. The particular supporting arrangement for the outboard sections is shown merely by way of example and is not intended as an actual structure arrangement capable of immediate use in aircraft. The breaks between the outboard section of the wings 11 and 21 and the inboard sections 10 and 20 are covered by molded sheets of high strength dielectric material to aid in adding structural strength and also to preserve the streamlined characteristic of the wings. The insulating sheets are indicated by reference numerals 14 and 24. Each of the outboard sections is provided with a transitional tapered tongue like conductor sections 15 and 25 which at the small ends thereof are connected to the inner conductors 16 and 26 of the coaxial transmission lines $TL_1$ and $TL_2$. The transitional section may be constructed as illustrated in more detail in my copending application Serial No. 651,902 filed March 4, 1946, to which application reference may be had for a detailed disclosure. The outer shells of the transmission lines are conductively connected to the metallic structure of the plane at their outer ends at least and at as many other points as may be found desirable. The two coaxial lines $TL_1$ and $TL_2$ go to the same general location within the fuselage of the plane and there their inner conductors may be connected in a balanced relationship to input or output circuits of radio receivers or transmitters as the case may be.

The radiation patterns in Figures 2 to 14 inclusive werer actually measured on a small model plane having an overall wingspread of 22.2 centimeters in which the outboard sections 11 and 21 were each 4.8 centimeters in length. The expanded zero circles in the figures should be noted. The zero signal strength location was expanded from a point to a circle to permit a more careful study of the low signal strength areas of the patterns.

Figures 2, 3 and 4 show the measured radiation pattern for wingspreads which are values equal to a half wavelength, .65 wavelength and .75 wavelength. It will be noticed that for this comparatively broad wave band the patterns are roughly figure eight in form with large broad lobes fore and aft and fairly deep minima off the wing tips.

It will be noted that the major effect of the decrease in wavelength is a slight decrease in depth of minima off the wing tips.

When the wingspread to wavelength ratio reaches 1.2 as shown in Figure 5, the pattern becomes six-lobed with maxima fore and aft. The principal minima are still off the wing tips but secondary minima occur at angular intermediate points between the wing tip direction and the fore and aft maxima.

The radiation pattern in Figure 6 where the wingspread to wavelength ratio is 1.50 shows slightly different minima at intermediate positions between the fore and aft direction of the wing tip direction.

A further increase in the wingspread to wavelength ratio to 1.75 increases the fore and aft lobes and generally compresses the radiation pattern somewhat in the wing tip direction. The minima are slightly deeper but still not so much so as to be highly objectionable. This pattern is shown in Figure 7.

Figure 9 illustrates the radiation pattern for wingspread to wavelength ratio of 2.5. It will be noted here that the minima off the wing tips are considerably broader than in the previous figures.

This is also true of Figures 10 and 12 which are for wingspread to wavelength ratios of 2.3 and 3.

Figure 11, showing the radiation pattern for a wavelength ratio of 2.5, as in Figure 9, illustrates the effect of changing the feed points to a distance of .105 wingspread in from the tips of the wings.

Figures 13 and 14 illustrate the pattern obtained by feeding the two wings in an in-phase relationship. It will be noted that four-lobed radiation patterns are obtained with nulls dead ahead and dead astern, in addition to the nulls off the wing tips. This manner of feeding the wings is not recommended because of the ahead and astern nulls.

While no detail measurements were made of the radiation pattern in planes other than horizontal, preliminary investigations at a few frequencies indicate that the patterns in planes 10, 20 and 30 degrees above and below the horizon are quite similar to the corresponding horizontal-plane patterns. The data from which the patterns of Figures 2 to 14 inclusive were taken indicates that the presence on the aircraft, of the fuselage, tail assembly and motor nacelles, etc., produces very little effect on the pattern up to frequencies corresponding to a wingspread to wavelength ratio of 2.3.

In general the vertically polarized radiation from balanced wing antennas is much less than the horizontal. At some frequencies it was found to be too low to be measureable and, under most circumstances, it can generally be said that the vertically polarized field strength is at least 20 to 30 db. below the maximum horizontally polarized signal. Of course, for very long range communication, there may be sufficient rotation of the plane of polarization through the extended length of the transmitting medium to permit the efficient use of wing antennas with vertical ground station antennas.

Figure 1:
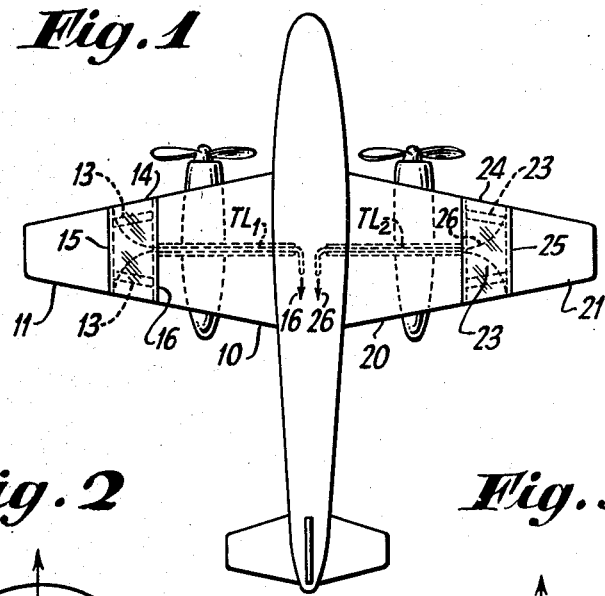
Figure 2:
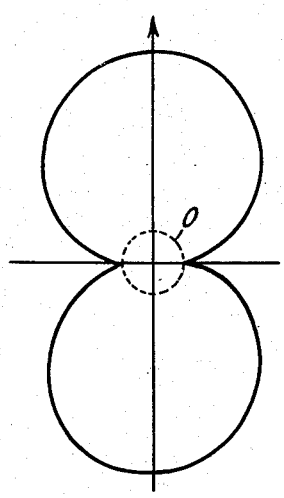
Figure 3:
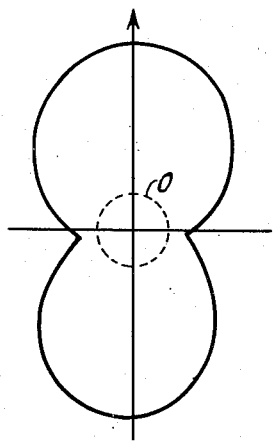
Figure 4:
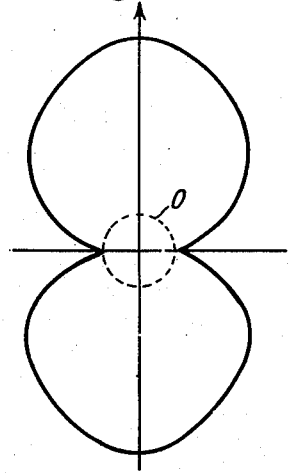
Figure 5:
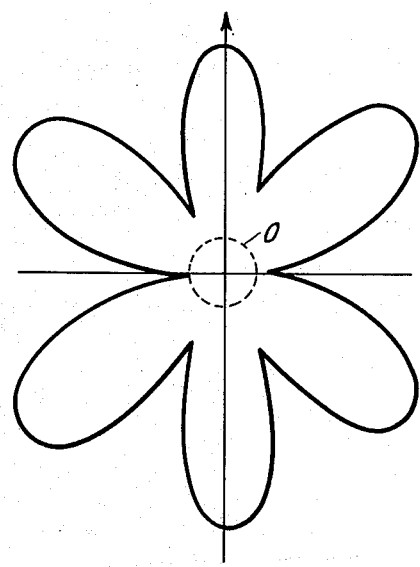
Figure 6:
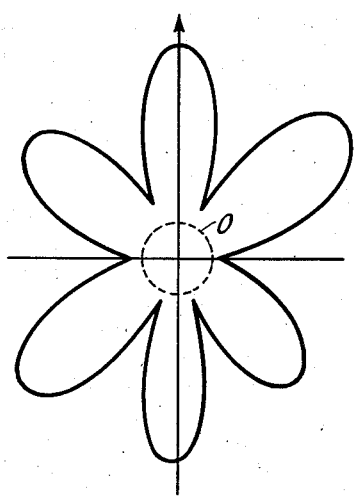
Figure 7:
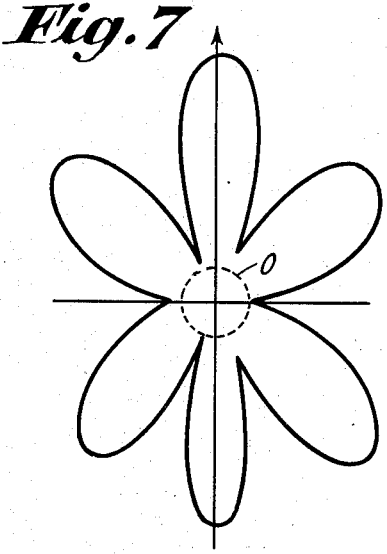
Figure 8:
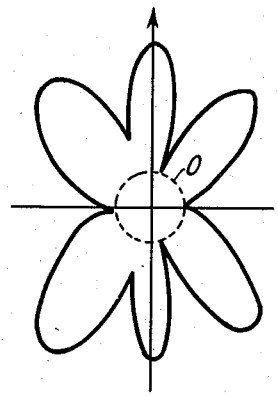
Figure 8 shows the radiation pattern for wingspread to wavelength ratio of 2.00. The slight dissymmetry between the right and left hand sides is due to inaccuracy of construction of the test model of this measured radiation pattern, and would not be harmful in a full sized structure.

The input impedance characteristics of directly fed wing antennas were also explored to some extent by means of a scale model of the aircraft of Figure 1.

Figure 15:
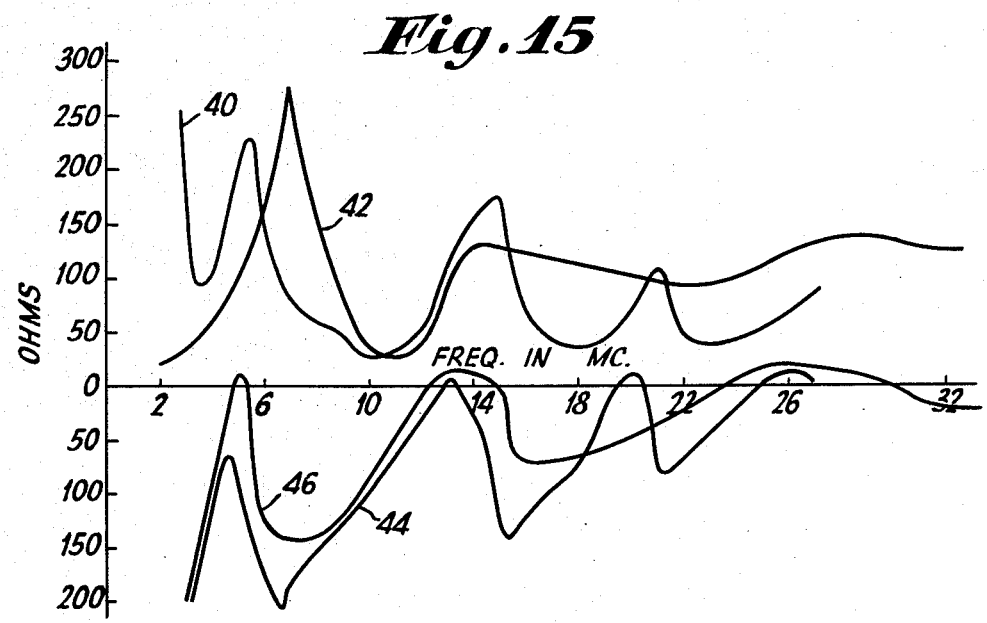

The impedance data is plotted in Figure 15 for two different locations of the feed point. The impedance data was taken over a range of frequencies corresponding to the 3 to 30 megacycles band. The input resistance for a feed point .105 wingspread in from the tip of the wing is shown by curve 40 (Figure 15), while the corresponding input reactance data is shown by curve 44. Changing the feed point to a location .245 wingspread in from the tip resulted in a resistance curve as shown by curve 46. It will be noted from these curves that the input impedance characteristics when fed through a broad band feed system, such as obtained by use of the tapered transitional section, is relatively flat over a very wide range of frequencies. It will be noted, however, that as the feed points are moved out toward the wing tips the general impedance level rises; that is, curve 40 is in general at a higher level than curve 42 and the reactance shown by curve 44 is more capacitative than that shown by curve 46.

For feed points less than .20 wingspread in from the tips, the apparent input resistance rapidly approaches infinity and the input reactance rapidly approaches negative infinity as the frequency becomes less than that corresponding to a wingspread to wavelength ratio of .30. This is clearly indicated by the extremely left-hand portion of the curves.

For feed points more than the .20 wingspread in from the tips, the input resistance rapidly approaches zero and the input reactance approaches negative infinity as the frequency becomes less than that corresponding to wingspread to wavelength ratio of .30.

For feed points lying at distances between .25 and .10 wingspread in from the wing tips and possibly to some extent to either side of these limits the input impedance is capable of matching by means of automatic tuning devices over the range of frequencies corresponding from .3 to 2.0 wingspread to wavelength ratio. At higher frequencies, corresponding to wingspread more than 2 wavelengths, the antennas are practically broad band and capable of efficient operation when fed directly without a matching section; note particularly the flat portion of curve 40 at the right hand portion of Figure 15.

Figure 16:
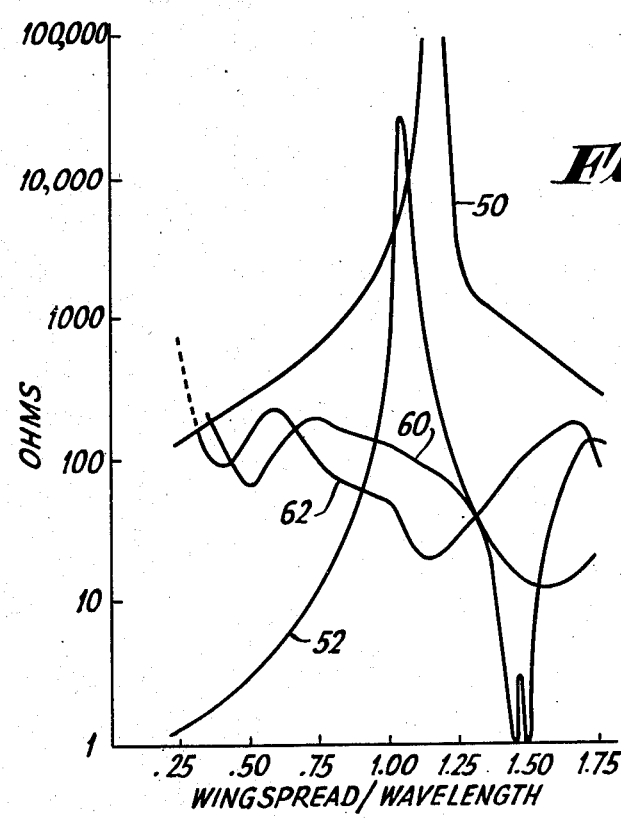

A decided advantage of the direct feeding of the wing tips over shunt feeding is indicated by Figure 16, in which impedance data on a shunt fed wing is compared with one set of data on a directly fed wing. Curve 50 shows the reactance characteristics for a shunt-fed wing over a range of frequencies and curve 52 shows the resistance characteristics over the same range of frequencies while curve 60 shows the reactance characteristics over a band of frequency for a directly fed wing and curve 62, the resistance characteristics over the same band of frequencies. It is evident that the impedance characteristics of the directly-fed wing are flatter than those of the shunt-fed wing by several orders of magnitude. This should be apparent at a glance by comparing curves 50 and 60. Likewise, the resistance characteristics of the directly-fed wing as shown by curve 62 are considerably better than the resistance characteristics of the shunt-fed wing as shown by curve 52. This may be attributed at least in part to the fact that in directly feeding the antennas, it is possible to provide a truly broad band feed system by the use of the tapered transitional section and thus take advantage of the inherent bandwidth of the large area radiating surface of the wing. In shunt feeding the wing the inherent band width is entirely obscured by the narrow band characteristics of the shunt-feed wire.

While I have illustrated a particular embodiment of the present invention, it should be clearly understood that it is not limited thereto since many modifications may be made in the several elements employed and in their arrangement but it is therefore contemplated by the appended claims to cover any such modifications as fall within the spirit and scope of the invention.

I claim:

1. An antenna system including the wing structure of an airplane having a conductive outer surface extending over the wings thereof, each of said wings having a transverse electrical discontinuity thereacross forming electrically separate inboard and outboard portions of each wing, and means for applying high frequency energy across said discontinuities, the wingspread to operating wavelength ratio being more than 0.3.

2. An antenna system including the wing structure of an airplane having a conductive outer surface extending over the wings thereof, both of said wings having transverse electrical discontinuities thereacross forming electrically separate inboard and outboard portions of each wing, and means for applying high frequency energy across said discontinuities, the outboard portions of said wings each being from .10 to .25 of the total wing spread, the wingspread to operating wavelength ratio being more than 0.3.

3. An antenna system including the wing structure of an airplane having a conductive outer surface, said wing structure having transverse electrical discontinuities thereacross forming electrically separate inboard and outboard portions of said wing structure and means for applying high frequency energy across said discontinuities, the outboard portions of said wing structure being provided with a tapered conductive tongue extending toward the inboard portion of said wing structure, a coaxial transmission line having an inner conductor connected to the apex of said tongue and the outer shell connected to the outer end of the inboard portion of said wing structure.

4. An antenna system including the wing structure of an airplane having a conductive outer surface extending over the wings thereof, said wings having a transverse electrical discontinuity thereacross forming electrically separate inboard and outboard portions of each wing and means for applying high frequency energy across said discontinuities, the outboard portions of said wings each being from .10 to .25 of the total tip-to-tip wingspread, the outboard portions of said wings being provided with a tapered conductive tongue extending toward the inboard portions of said wings, a coaxial transmission line having an inner conductor connected to the apex of said tongue and the outer shell connected to the outer end of the inboard portions of said wings.

5. An antenna system including the wing structure of an airplane having a conductive outer surface extending over wing members thereof, said members having a transverse electrical discontinuity thereacross forming electrically separate inboard and outboard portions of each member and means for applying high frequency energy across said discontinuities, the wingspread to operating wavelength ratio being more than 0.3, the outboard portions of said members being provided with a tapered conductive tongue extending toward the inboard portions of said members, a coaxial transmission line having an inner conductor connected to the apex of said tongue and the outer shell connected to the outer end of the inboard portions of said members.

6. An antenna system including the wing structure of an airplane having a conductive outer surface extending over the wings thereof, said wings having transverse electrical discontinuities thereacross forming electrically separate inboard and outboard portions of each wing, and means for applying high frequency energy across said discontinuities, the outboard portions of said wings each being from .10 to .25 of the total wingspread, the wingspread to operating wavelength ratio being more than 0.3, the outboard portions of said wings being provided with a tapered conductive tongue extending toward the inboard portions of said wings, a coaxial transmission line having an inner conductor connected to the apex of said tongue and the outer shell connected to the outer end of the inboard portions of said wings.

7. An antenna system including the wing structure of an airplane having a conductive outer surface forming a part of the wings thereof, said wings having transverse electrical discontinuities thereacross forming electrically separate inboard and outboard portions of each wing, and means for applying high frequency energy across said discontinuities, each of the outboard portions of said wings being provided with a tapered conductive transition member for coupling said outboard portion to the inner conductor of a transmission line the outer conductor of which is connected to said inboard portion.

8. An antenna system including the wing structure of an airplane having a conductive outer surface forming the exterior of the wings thereof, said wings having transverse electrical discontinuities forming electrically separate inboard and outboard portions of each wing, and means for applying high frequency energy across said discontinuities, the outboard portions of said wing each being from .10 to .25 of the total wingspread, each of the outboard portions of said wings being provided with a tapered conductive transition member for coupling said outboard portions to the inner conductor of a transmission line the outer conductor of which is connected to said inboard portions.

9. An antenna system including the wing structure of an airplane equipped with wings having a conductive outer surface, said wings having transverse electrical discontinuities thereacross forming electrically separate inboard and outboard portions of each wing, and means for applying high frequency energy across said discontinuities, the wingspread to operating wavelength ratio being more than 0.3, each of the outboard portions of said wings being provided with a tapered conductive transition member for coupling said outboard portions to the inner conductor of a transmission line the outer conductor of which is connected to said inboard portions.

10. An antenna system including the wing structure of an airplane having a conductive outer surface extending over members branching from the fuselage of said airplane, said members having transverse electrical discontinuities thereacross forming electrically separate inboard and outboard portions thereof and means for applying high frequency energy across said discontinuities, the outboard portions of said members each being from .10 to .25 of the total wingspread, the wingspread to operating wavelength ratio being more than 0.3, each of the outboard portions of said members being provided with a tapered conductive transition member for coupling said outboard portions to the inner conductor of a transmission line the outer conductor of which is connected to said inboard portions.

11. An antenna system including the wing structure of an airplane having a conductive outer surface, said structure having a transverse electrical discontinuity thereacross forming electrically separate inboard and outboard portions thereof, and means for applying high frequency energy across said discontinuity, the outboard portion of said structure having a length lying between 0.10 and 0.25 of the total wing spread, the ratio of wingspread to operating wavelength being more than 0.3.

12. An antenna system including the wing structure of an airplane having a conductive outer surface, said structure having a transverse electrical discontinuity thereacross forming electrically separate inboard and outboard portions thereof, and means for applying high frequency energy across said discontinuity, the outboard portion of said structure having a length lying between 0.10 and 0.25 of the total wing spread, the ratio of wingspread to operating wavelength being more than 0.3, the outboard portions of said structure being provided with a tapered conductive tongue extending toward the inboard portion of said structure, a transmission line having an inner conductor connected to the apex of said tongue and the outer shell connected to the outer end of the inboard portion of said structure.

13. An antenna system including the wing structure of an airplane having a conductive outer surface extending over the wings thereof, at least one of said wings having a transverse electrical discontinuity thereacross forming electrically separate inboard and outboard portions thereof, and means for applying high frequency energy across said discontinuity, the outboard portion of said wings having a length lying between 0.10 and 0.25 of the total wing spread, the ratio of wingspread to operating wavelength being more than 0.3, the outboard portions of said wing being provided with a tapered conductive tongue extending toward the inboard portion of said structure, a coaxial transmission line having an inner conductor connected to the apex of said tongue and the outer shell connected to the outer end of the inboard portion of said wing.

14. An antenna system including the wing structure of an airplane having a conductive outer surface, said structure having a transverse electrical discontinuity thereacross forming electrically separate inboard and outboard portions thereof, and means for applying high frequency energy across said discontinuity, the outboard portion of said structure having a length lying between 0.10 and 0.25 of the total wing spread, the ratio of wingspread to operating wavelength being more than 0.3, the outboard portions of said structure being provided with a tapered conductive tongue extending toward the inboard portion of said structure, a coaxial transmission line having an inner conductor connected to the apex of said tongue and the outer shell connected to the outer end of the inboard portion of said structure.

15. An antenna system including the structure of an airplane comprising a branch structure having a conductive outer surface projecting from the fuselage of said airplane, said branch structure having a transverse electrical discontinuity thereacross forming electrically separate inboard and outboard portions thereof, and means for applying high frequency energy across said discontinuity, the outboard portion of said branch structure having a length lying between 0.10 and 0.25 of the total spread of said branch structure, the ratio of spread to operating wavelength being more than 0.3, the outboard portions of said branch structure being provided with a tapered conductive tongue extending toward the inboard portion thereof, a coaxial transmission line having an inner conductor connected to the apex of said tongue and the outer shell connected to the outer end of the inboard portion of said branch structure.

16. An antenna system for an airplane including wing-like members having a conductive outer surface, said members having transverse electrical discontinuities thereacross forming electrically separate inboard and outboard portions of each member, and means for applying high frequency energy across said discontinuities, the outboard portion of said members having lengths lying between 0.10 and 0.25 of the total tip-to-tip spread of the members, the ratio of tip-to-tip spread to operating wavelength being more than 0.3, the outboard portions of said members being provided with tapered conductive tongues extending toward the inboard portions thereof, a coaxial transmission line having an inner conductor connected to the apex of each of said tongues and the outer shell connected to the outer end of the inboard portions of said members.

ROBERT S. WEHNER.

REFERENCES CITED

The following references are of record in the file of this patent:

UNITED STATES PATENTS

| Number | Name | Date |
|---|---|---|
| 2,182,484 | Mills | Dec. 5, 1939 |
| 2,235,139 | Bruce | Mar. 18, 1941 |
| 2,239,724 | Lindenblad | Apr. 29, 1941 |
| 2,242,200 | Woods | May 13, 1941 |

FOREIGN PATENTS

| Number | Country | Date |
|---|---|---|
| 366,421 | Italy | Dec. 27, 1938 |